United States Patent [19]

Lorteije et al.

[11] 4,121,256

[45] Oct. 17, 1978

[54] COLUMN ELECTRODE DRIVE FOR GAS DISCHARGE DISPLAY DEVICE

[75] Inventors: Jean Hubertus Josef Lorteije; Geert Warrink, both of Eindhoven, Netherlands

[73] Assignee: U.S. Philips Corporation, New York, N.Y.

[21] Appl. No.: 776,253

[22] Filed: Mar. 10, 1977

[30] Foreign Application Priority Data

Mar. 24, 1976 [NL] Netherlands ......................... 7603056

[51] Int. Cl.$^2$ ........................ H04N 3/12; H05B 41/00
[52] U.S. Cl. ............................... 358/240; 315/169 TV
[58] Field of Search .............................. 358/241, 240; 315/169 TV; 340/324 M

[56] References Cited

U.S. PATENT DOCUMENTS

| | | | |
|---|---|---|---|
| 3,838,209 | 9/1974 | Tsuchiya et al. | 315/169 TV |
| 3,883,778 | 5/1975 | Kaji et al. | 315/169 TV |
| 4,006,298 | 2/1977 | Fowler et al. | 358/240 |

*Primary Examiner*—John C. Martin
*Attorney, Agent, or Firm*—Frank R. Trifari; Daniel R. McGlynn

[57] ABSTRACT

A saving in column memory elements while preserving a stable display with a gas discharge television display device is obtained if a plurality of bits of the digital video information which is entered in the line trace period is passed from the line memory circuit to the relevant column electrode in the line blanking period while bypassing a column memory circuit. The display elements are excited only once during a line period at the beginning of the line period.

3 Claims, 2 Drawing Figures

COLUMN ELECTRODE DRIVE FOR GAS DISCHARGE DISPLAY DEVICE

The invention relates to a television display device comprising a plurality of display elements which are arranged in rows and columns, a row scanning circuit for each time choosing a subsequent row of display elements during a line period, a digital line memory circuit for storing digital video information to be reproduced during a line period and a column memory circuit for taking over during a line blanking period video information from the line memory circuit for controlling column conductors, retaining that information until the next line blanking period and energizing, via the column conductors by means of amplitude and time modulation with the video information in the desired luminance the row of display elements chosen by the row scanning circuit.

Dutch Patent Application 7507782 discloses such a display device with gas discharge display elements in which the line memory circuit comprises a plurality of shift registers corresponding to the plurality of binary digits or bits in which the digital video information is to be processed. The bits of the information associated with a same picture element can be transferred from corresponding elements of the shift register in the line blanking period to a column memory circuit which only consists of a small number of elements. The relevant column electrode is energized by means of this column memory circuit. To this end the line period is subdivided in periods of time which are each time twice as long as the preceding period and a number of which are situated or begin within the line blanking period. A bit of the video information obtained from the column memory is associated with each time period. This results in a current through the relevant display element during the occurrence of a bit value one and no current during the occurrence of a bit value zero. A modulation occurs of the period of time in which current flows through the display element and of the amplitude of that current. It is indeed true that this current requires only a small number of column memory elements as compared with a time duration modulation circuit but the display obtained with it in not very stable.

It is an object of the invention to provide a display device in which the number of column memory elements for each picture element is less than the number of bits of video information to be processed but which results in a stabler display.

A gas discharge television display device of the type according to the invention mentioned above is therefore characterized in that each time during the line blanking period a portion of the digital video information is applied to the column conductors bypassing the column memory circuit. In the column memory circuit the remainder of the video information is taken over from the memory circuit and the reproduction of the digital video information present in the line and column memory circuits takes place uninterruptedly in a same line period.

Applicant observed that, when using gas discharge display elements repeatedly interrrupting the gas discharge during a line period must be avoided in order to obtain a stabler display. In order to yet obtain a proper modulation of the luminence at an uninterrupted lighting up of the gas discharge during a line period a suitable amplitude — and time modulation of the current through the display elements is used. Each bit of video information produces a current of a matched amplitude and time duration through a picture element. All these currents may start simultaneously at the beginning of the line blanking period. A number of bits produces a current having a time duration which is within the line blanking period and which consequently need not be stored in the column memory. The remainder of the bits is stored in the column memory in order to be available also after the line blanking period when the line memory must again be filled with video information. Since the gas discharge is now no longer interrupted for each display element in a line period, an ionization period which depends on that interruption time can substantially play no part in the luminence of the display so that the latter shows a greatly improved stability.

A given current strength and time duration is added to each bit information. If the video information produces six bits per picture element the three least significant bits may, for example, produce a current having a time duration $\tau$ which is within the line blanking period and whose amplitude increases by a factor of two at each step the significance increases and may consequently amount to I, 2I and 4I. The fourth, fifth and sixth bit may produce a current having a time duration $8\tau$ whose amplitude may also amount to I or 2I and 4I respectively and in which $8\tau$ may be equal to the line period. The current-time product is now for the successive bits I $\tau$, 2I $\tau$, 4I $\tau$, 8I $\tau$, 16I $\tau$ and 32I $\tau$ respectively so that the desired luminence modulation occurs. The column memory circuit then requires only three storage elements for each picture element. This series of current-time products can also be produced in other manners, such as, for example, by choosing the time duration $\tau$, $2\tau$, $4\tau$, $8\tau$ and $8\tau$ and the amplitude I, I, I, I, 2I and 4I for the successive bits. In that case, for $8\tau$ equal to the line period one time period $\tau$ less than the line blanking time is obtained so that five storage elements per picture element are required in the column memory circuit.

The invention will now be further explained with reference to the drawing.

DESCRIPTION OF THE PREFERRED EMBODIMENT

Figure 1:
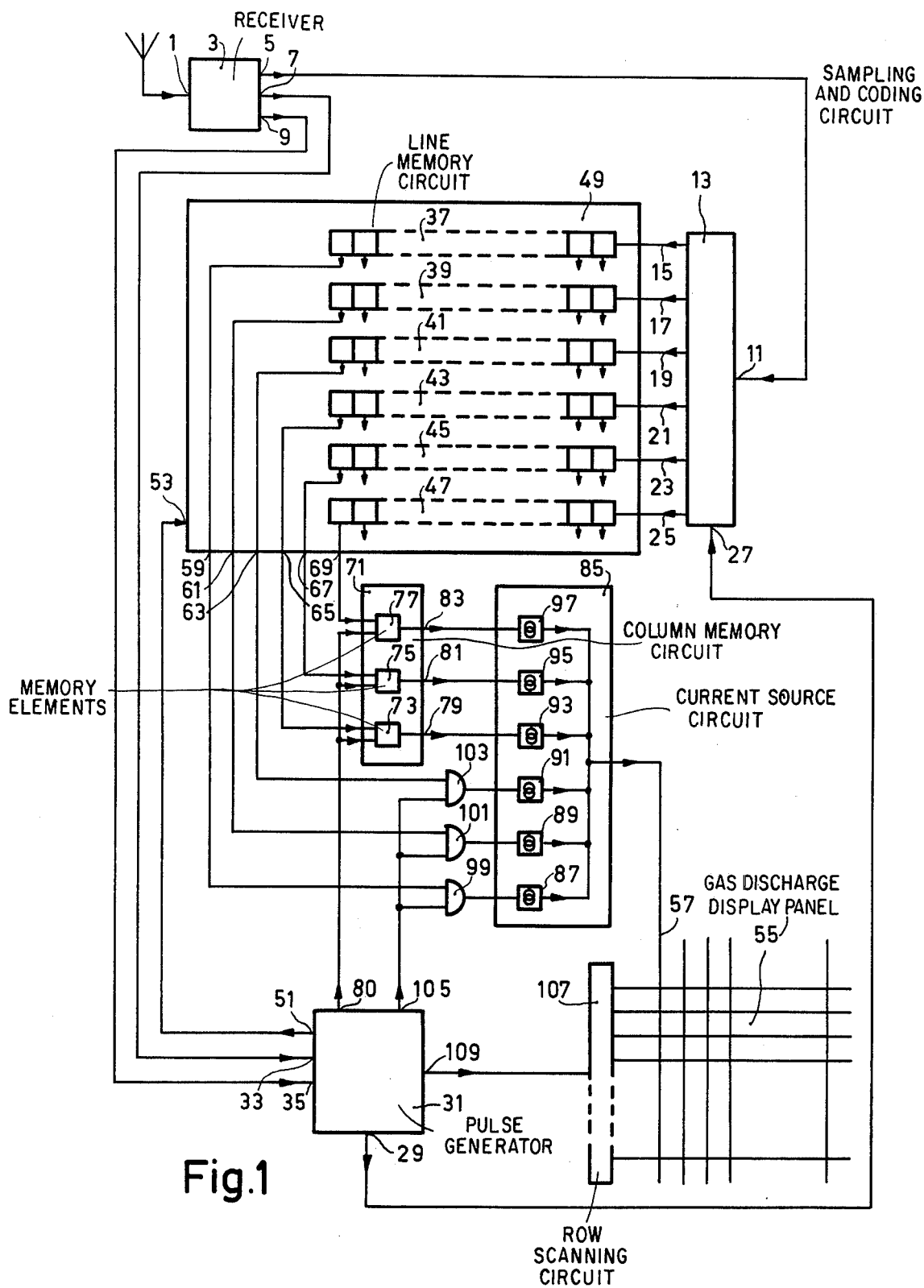
FIG. 1 shows a simplified block diagram of a television display device according to the invention and FIG. 2 shows a simplified circuit diagram of a possible current source circuit for use in a display device according to FIG. 1.

In FIG. 1 an in-coming television signal is supplied to an input 1 of a receiving section 3. After having been mixed, amplified and demodulated this signal is converted into a luminance signal which becomes available at an output 5, a horizontal synchronization signal which appears at an output 7 and a vertical synchronization signal at an output 9. In the above and herein below the luminance signal is also called video information.

From the output 5 the luminance signal is supplied to an input 11 of a sampling and coding circuit 13. In this circuit 13, samples are periodically taken from the luminance signals which samples are converted into a group of binary signals which appear at six outputs 15, 17, 19, 21, 23 and 25 of the sampling and coding circuit 13. After each sampling action a signal group which represents a binary number whose value corresponds to the amplitude of the signal at the input 11 appears at these outputs. This number has a plurality of binary digits or bits. The signal corresponding to the least significant bit appears at the output 15 and the signals corresponding to be bits of increasing significance at the outputs 17 or 19, 21, 23 and 25 respectively.

In addition, the sampling and coding circuit 13 has an input 27 to which a pulse signal is supplied which controls the sampling and conversion. This pulse signal is derived from an output 29 of a pulse generator 31. This generator is controlled by the synchronization signals which are derived from the outputs 7 and 9 of the receiving circuit 3 and supplied to two inputs 33 and 35.

From the outputs 15, 17, 19, 21, 23, 25 of the sampling and coding circuit 13 the signals are fed to six shift registers 37, 39, 41, 43, 45, 47 in a line memory circuit 49. Under the influence of a pulse signal which is obtained from an output 51 of the pulse generator 31 and fed to an input 53 of the line memory circuit 59 the digital video information is stored in the line memory during the line scan period of the line period.

The shift registers 37, 39, 41, 43, 45, 47 each have a plurality of sections which correspond to the plurality of the picture elements to be displayed and which occur in the line scan period.

Sections which correspond to one another as regards their place are coupled to the same column electrode of a gas discharge display panel 55. For simplicity sake this is shown in the FIG. 1 for only one group of sections and one column electrode, namely for the last sections of the shift register 37, 39, 41, 43, 45 and 47 and the first column electrode 57 of display panel 55. The last sections of the shift registers each have an output which is connected to an output 59, 61, 63, 65, 67, 69 of the line memory circuit 49. The outputs 69, 67 and 65 which carry the most significant bits of the video information are connected to inputs of a column memory circuit 71 which comprises three memory elements 74, 75, 77. At the end of the line scan period the video information from the last sections of the shift registers 43, 45, 47 are written into these memory elements 73, 75, 77 by means of a pulse derived from an output 80 of the pulse generator 31. During the entire subsequent line period this information is available at outputs 80, 81 and 83 of the memory element 73, 75, 77. This information controls a current source circuit 85 which comprises six current sources 87, 89, 91, 93, 95, 97 whose outputs are connected to the column electrode 57. The current sources 87 and 93 each supply a current I, the current sources 89 and 95 each a current 2I and current sources 91 and 97 each a current 4I if a bit having the value one is supplied to their input. They supply no current if a bit having the value zero is supplied to their input. Since the memory elements 73, 75, 77 are entered again each time at the end of the line period the current sources 93, 95, 97 can supply a current during the entire line period which is assumed to be 8 $\tau$. The current sources 87, 89, 91 can only supply a current during a period of time $\tau$. They are specifically controlled by three AND-gates 99, 101, 103 to which a pulse having a length $\tau$ is applied from an output 105 of the pulse generator 31. The other inputs of the AND-gates 99, 101, 103 bypass the column memory and are connected to the outputs 59, 61, 63 of the line memory circuit 49. The information at those outputs controls without the intermediance of column memory elements the current sources 87, 89, 91 via the AND-gate 99, 101, 103 which may be conductive for a period of time $\tau$. This period of time $\tau$ is entirely comprised in the line blanking period and starts simultaneously with the time 8 $\tau$, in which the memory elements 73, 75, 77 have their information available at their outputs. Supplying information to the column electrodes 57 bypassing the column memory circuit results in a considerable saving in memory elements.

So the column electrode is controlled by a sum of currents which start flowing at the beginning of the line blanking period and which continuous flowing without interruption during the line period until the end of the display period, which end is determined by the digital information. It will be clear that this end may also come after $\tau$ or after 8 $\tau$. Influences of ionization times at gas discharge display elements are prevented by this uninterrupted display so that it becomes very stable.

So in each line period the current source 87 can supply a current-time product of I $\tau$ to the column electrode 57, the current sources 89, 91, 93, 95 and 97 a current-time product of 2I $\tau$, 4I $\tau$, 8I $\tau$, 16I $\tau$, and 32I $\tau$ respectively.

Furthermore, the display panel 55 comprises a plurality of row electrodes which are successively chosen during a line period by a row scan circuit 107 so that display elements — which are formed by gas discharges on the intersections with the column electrodes — along the relevant row electrode can light up. To that end the row scanning circuit 107 receives from an output 109 of the pulse generator 31 a signal by means of which a row scan is effected.

Although in one and the same line period the starting instants of the control of a column electrode with the various bits is preferably chosen to be equal this is not absolutely necessary.

Figure 2:
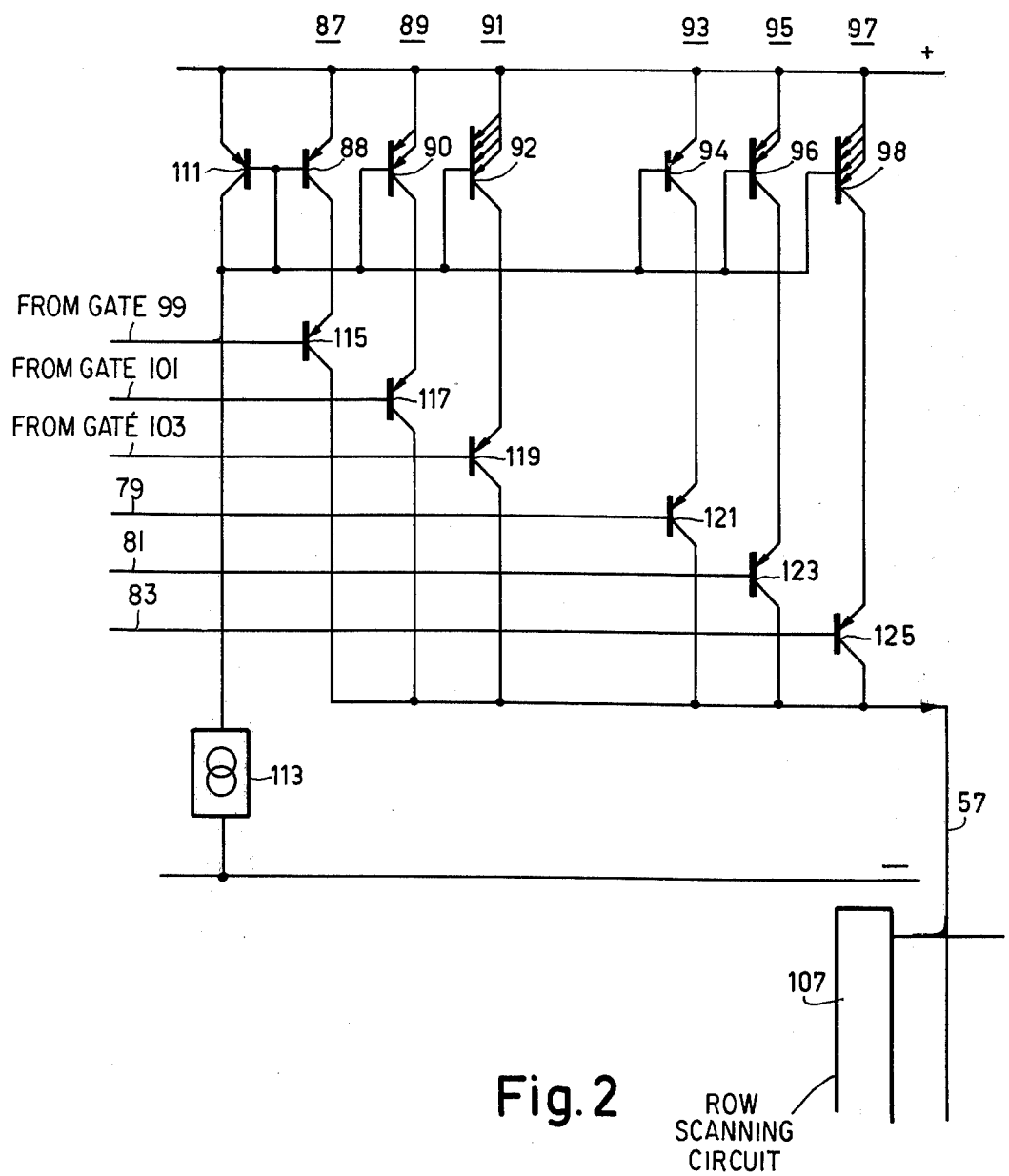

The current sources 87, 89, 91, 93, 95, 97 can be provided with resistors or, as shown in FIG. 2, with transistors.

In FIG. 2 corresponding parts have been given the same reference numerals as in FIG. 1. The current sources 87, 89, 91, 93, 95, 96 are provided with transistors 88, 90, 92, 94, 96 and 98 whose effective emitter areas are in the ratio of 1:2:4:1:2:4 and whose bases are connected via a transistor 111 which is connected as a diode on the one hand to the interconnected emitters and a positive supply voltage and on the other hand to a reference current source 113 which determines the amplitude of the current value I and consequently the luminence of the display. The collectors of the transistors 87, 89, 91, 93, 95, 97 are connected via a transitor 115 or 117, 119, 121, 123, 125 respectively which serves as a switch to the column electrode 57. By means of the digital signals at the inputs 59, 61, 63, 65, 67, 69 which are connected to their bases the transistors 115, 117, 119, 121, 123 and 125 are cut-off or rendered conductive, in this case a low voltage value corresponding to the binary value one and a high voltage value to the binary value zero. The AND-gates 103, 101, 99 must be gates which supply a low output voltage when the two input voltages are low and a high output voltage when one of the inputs is high.

It will be obvious that such a current source circuit may be constructed as an integrated circuits.

Although in the above the digital video information is processed in six bits, it is also possible to opt for a larger or smaller number of bits and to choose the distribution of the plurality of bits which are passed via and along the column memory at will. So, for example, in the case of a seven bits video information four bits may by-pass the column memory and three bits may be passed through the column memory.

It is evident, that, it so desired, a circuit according to the invention can also be used with flat television display apparatus which are provided with other display elements than gas discharge display elements or which comprise a more complicated gas discharge display device in which, for example, line scanning is performed by a pre-ionizing auxiliary discharge to a third electrode system.

What is claimed is:

1. A display device comprising
    a plurality of display elements arranged in rows and columns, including row conductors and column conductors;
    a row scanning circuit connected to said display elements for scanning said rows of said display element;
    means which control activation of said column conductors connected to said column conductors;
    a digital line memory circuit for storing digital video information to be displayed during a line period of said row scanning circuit;
    a column memory circuit connected to said line memory circuit for acquiring a first portion of video information therefrom, and to said means which control activation of said column conductors in response to said first portion of video information;
    means connecting said digital line memory circuit to said means which control activation of said column conductors, by passing said column memory circuit, which provide a second portion of said digital video information stored in said memory circuit to said column conductors during a line blanking period, the display of said first and second portions of said video information taking place during the same line period.

2. A device as defined in claim 1, wherein said column memory circuit comprises a predetermined number of 1-bit memory storage elements, said predetermined number being approximately half the number of bits of video information in each picture element.

3. A device as defined in claim 1, wherein said means which control activation of said column conductors comprises a current source circuit connected between said line memory circuit, said column memory circuit, and said column conductors.

* * * * *